Figure 1:
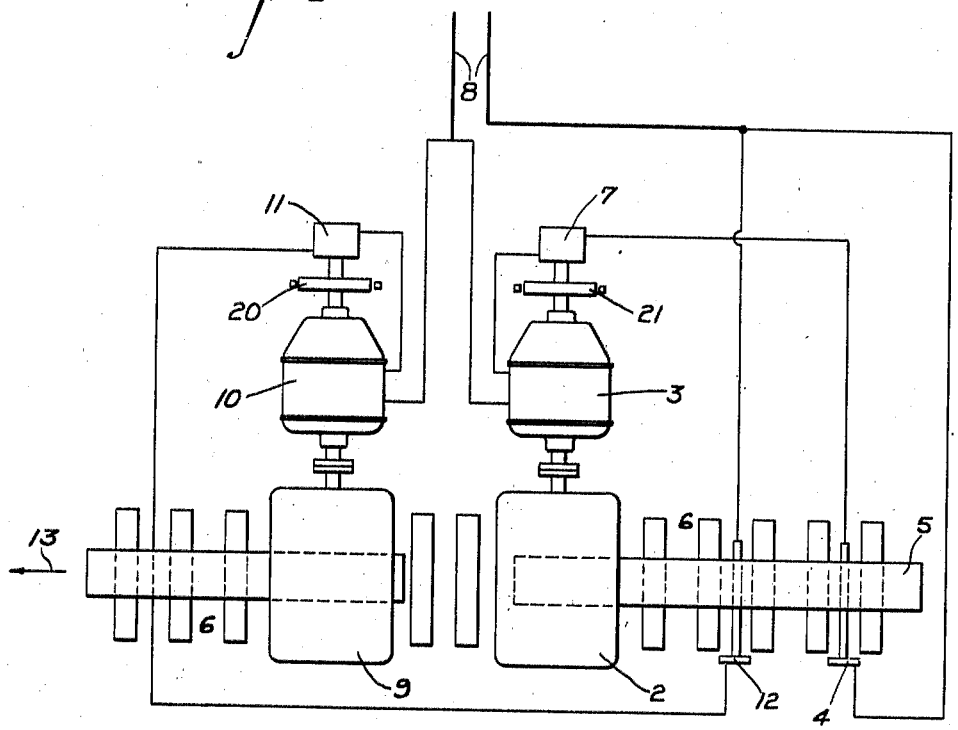

Aug. 7, 1928.

L. IVERSEN 1,680,048

APPARATUS AND METHOD OF SHEARING

Filed March 18, 1927

INVENTOR
Lorenz Iversen
by his attys
Byrnes, Stebbins + Parmelee

Patented Aug. 7, 1928.

1,680,048

UNITED STATES PATENT OFFICE.

LORENZ IVERSEN, OF PITTSBURGH, PENNSYLVANIA, ASSIGNOR TO MESTA MACHINE COMPANY, OF PITTSBURGH, PENNSYLVANIA, A CORPORATION OF PENNSYLVANIA.

APPARATUS AND METHOD OF SHEARING.

Application filed March 18, 1927. Serial No. 176,439.

The present invention relates broadly to the art of metal cutting, and more particularly to the art of cutting metal shapes, such as sheets, bars, strips and the like while moving at a comparatively high speed.

Heretofore it has been customary in the art to which the present invention relates, to provide means for shearing moving shapes, such means having the ability to attain an instantaneous cutting speed substantially equal to the speed of the material being cut. In order to shear the material in predetermined lengths, however, it is customary to provide a flag, or other tripping device, which is effective for setting the shear in operation at predetermined time intervals, whereby substantially equal lengths of metal are cut from the moving piece. While devices of this character have been effective for the purposes indicated, they have been objectionable for the reason that no provision is made for cropping the trailing end of the moving strip when the last length of material sheared is less than the length for which the shear is set.

An important object of the present invention is the provision of method and apparatus whereby the material being sheared may be cropped at both the leading and trailing ends, and cut into predetermined lengths.

Certain other objects of the invention are the provision of means whereby a moving strip of material may be sheared in predetermined lengths, or multiples of such lengths, and means whereby the trailing end of the moving strip may be cropped, although the last length of material sheared is less than the predetermined length into which the strip is being cut.

Still another object of the present invention is to provide a shear which may be continuously operated at a speed bearing definite relation to the speed of travel of the material to be sheared, and means whereby the trailing ends of the material may be cropped, although the last length of material sheared may be shorter than the length into which the material is being cut by the first mentioned shear.

In the accompanying drawings there is shown, for purposes of illustration only, a preferred embodiment of the present invention, it being understood that the drawings do not define the limits of my invention, as changes in the construction and operation disclosed therein may be made without departing either from the spirit of the invention or the scope of my prior claims.

Figure 2:
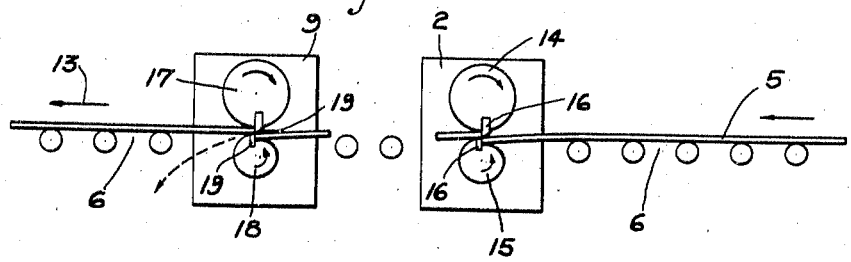

In the drawings:

Fig. 1 is a diagrammatic top plan view of shearing apparatus embodying my invention, and Fig. 2 is a side elevation of a portion of the apparatus shown in Fig. 1.

In carrying out the present invention, there may be provided a shear 2 driven by a motor 3, controlled by a flag 4. Material 5 to be sheared may be conveniently directed into the shear by a roll bed 6, as is well understood in the art.

The motor 3 may be provided with a limit switch 7 connected thereto so that the shear stops in predetermined relationship to the material after each shearing operation, in case the shear is used intermittently. As is well understood in the art to which this invention pertains, the limit switch 7 may be connected in series with the flag 4, and a winding of the motor 3, the electric current supplied to the motor being furnished by leads 8 connected to the motor and to the flag 4.

Adjacent the shear 2 I provide a shear 9, of similar construction, the shear 9 being adapted to crop the trailing end of the material being sheared. The shear 9 may be connected to a motor 10 controlled by a limit switch 11 connected in series with a flag 12, similar to the control device provided for the shear previously described.

When a strip of material is to be sheared, it may be fed along the roll bed in the direction of the arrow 13 into engagement with the shear 2. The moving strip operates the flag 4 to control the shear 2, causing the shear to crop the leading end and to perform periodic shearing operations upon the strip to produce pieces of predetermined length. The length sheared will, of course, depend upon the speed of travel of the material being sheared, the position of the flag 4, and the speed of operation of the shear 2. As is well understood in this art, certain of these factors may be kept constant while others are varied to produce the desired length of sheared material. If the speed of the material is increased, it will be apparent that a greater length will pass through the shears in a given unit of time, thereby increasing the length of the sheared pieces, while a decrease in speed will result in a decrease in the length of the sheared pieces. In like manner, positioning the flag 4 nearer the shears will result in a longer sheared length due to the fact that from the time of actuating of the flag to the time the piece enters the shears, the material will have to travel a less distance and will therefore project farther between the shears than would be the case if the flag were positioned a greater distance therefrom. Also, if the shears 2 are operated at a higher speed, they allow less time for the travel of the material and will cut shorter lengths therefrom, while if their speed is decreased they will cut less frequently under a given set of conditions and will produce longer lengths. The shear 2 may, of course, operate continuously, if desired.

The flag 12 is so constructed that it may be operated by the trailing end of the moving material. This flag will be operated only when the trailing end has passed beneath the flag 12, so that the shear 9 will be set into operation at the required time to crop the trailing end of the material passing along the roll bed 6.

The flag 12 may be of the general type illustrated in the patent to Frohn No. 1,318,320 of October 7, 1919, adapted to be actuated open upon cessation in the passage of stock in contact therewith. The flag 4 may be of the same general construction with the contacts reversed so as to close the circuit upon contact with moving material. Circuit closing devices of this nature are well known in the art.

As shown in Fig. 2, I prefer the type of rotary shear disclosed in my copending application, Serial No. 99595, filed April 3d, 1926. In this type of shear, there may be provided a rotor 14 and a rotor 15, the rotor 14 being larger than the rotor 15. Each of the rotors may be provided with a shear blade 16 adapted to cut the moving material. Rotors 14 and 15 are preferably driven a different number of revolutions per unit time, say rotor 14 turns 5 revolutions while rotor 15 turns 6 revolutions. By this arrangement, a shearing operation is effected once in every 5 revolutions of the rotor 14, thereby permitting the shear to be brought up to the speed of the material being cut.

The shear 9 adapted to crop the trailing end of the material may be constructed similarly to the shear 2. The shear 9 may be provided with rotors 17 and 18 carrying shear blades 19. As will be apparent from the drawings, the arrangement of the shear blades in the cropping shear 9 permits the trailing end of the piece to fall adjacent the shear 9 without being fed on to the roll bed 6 after being cut off.

Both of the shears may be stopped when desired by customary brakes 20 and 21 provided on the motors 10 and 3 respectively.

While I have described the preferred form of my apparatus as embodying a particular type of rotary shear, it will be understood that the invention is not limited to the particular shearing devices described, since various other types of flying shears may be employed within the spirit of the invention.

Thus I provide an improved method and apparatus for shearing moving material whereby the material may be cut into predetermined lengths, and the trailing end of the material may be cropped irrespective of the length of material remaining after the previous shearing operation.

I further provide an improved apparatus whereby a moving strip of material may be cropped at the leading end, cut into predetermined lengths, and cropped at the trailing end entirely automatically and irrespective of the length of material sheared.

I claim:

1. Apparatus for shearing a moving strip of material comprising means for cutting the strip into predetermined lengths, and means for cropping the trailing end of the strip.

2. Apparatus for shearing a moving strip of material, comprising a flying shear for cutting the strip into predetermined lengths, a shear for cropping the trailing end of the strip, and means controlling the operation of the cropping shear.

3. Apparatus for shearing a moving strip of material, comprising a flying shear adapted for cutting the strip into predetermined lengths, a shear for cropping the trailing end of the strip, and a flag controlling the operation of the cropping shear, said flag being operable by the moving strip.

4. Apparatus for shearing a moving strip of material, comprising a plurality of shears, a plurality of flags controlling said shears, one of the flags being adapted to set the shear in operation for cropping the leading ends of the strip and cutting the strip into predetermined lengths, one of the flags being adapted to set the shear into operation for cropping the trailing end of the strip.

5. Apparatus for shearing a moving strip of material, comprising a shear adapted for cropping the leading end of the strip, and cutting the strip into predetermined lengths, a motor for operating said shear, a flag controlling the motor, a second shear adapted for cropping the trailing end of the strip, a motor for operating the cropping shear, and a flag operated by the strip for setting the cropping shear motor into operation.

6. Apparatus for shearing a moving strip of material, comprising a shear adapted for cropping the leading end of the strip, and cutting the strip into predetermined lengths, a motor for operating said shear, a flag controlling the motor, a second shear adapted for cropping the trailing end of the strip, a motor for operating the cropping shear, a flag operated by the strip for setting the cropping shear motor into operation, and means for guiding the strip successively through the shears.

7. The method of shearing a moving strip of material, comprising cutting the strip into predetermined lengths, and cropping the trailing end of the strip.

8. The method of shearing a moving strip of material, comprising cropping the leading end of the strip, cutting the strip into desired lengths, and cropping the trailing end of the strip.

9. The method of operating a plurality of flying shears adapted to cut a moving strip of material, comprising the steps of actuating one of the shears to cut the strip of moving material into desired lengths, and actuating another shear to crop the trailing end of the strip.

10. The method of operating a plurality of flying shears adapted to cut a moving strip, comprising the steps of actuating one of the shears to crop the leading end of the strip, permitting such shear to remain in continuous operation to cut the strip into desired lengths, and operating another shear to crop the trailing end of the strip.

11. In the method of shearing, the steps comprising continuously moving the material to be sheared, cropping the leading end of the strip in predetermined timed relation to the movement thereof, cutting the strip into desired lengths, and cropping the trailing end of the strip in predetermined timed relation to its movement.

12. In the method of shearing material, the steps comprising continuously moving the material through a plurality of shears, actuating one of the shears to cut the material into desired lengths, and actuating another of the shears to crop the trailing end of the material.

In testimony whereof I have hereunto set my hand.

LORENZ IVERSEN.